United States Patent
Zhang et al.

(10) Patent No.: US 11,201,655 B2
(45) Date of Patent: Dec. 14, 2021

(54) WIRELESS COMMUNICATION METHOD AND WIRELESS COMMUNICATIONS APPARATUS

(71) Applicant: HUAWEI TECHNOLOGIES CO., LTD., Shenzhen (CN)

(72) Inventors: Ruiqi Zhang, Beijing (CN); Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/867,819

(22) Filed: May 6, 2020

(65) Prior Publication Data

US 2020/0266869 A1    Aug. 20, 2020

Related U.S. Application Data

(63) Continuation of application No. PCT/CN2017/110736, filed on Nov. 13, 2017.

(51) Int. Cl.
H04B 7/06     (2006.01)
H04L 1/00     (2006.01)
H04L 5/00     (2006.01)

(52) U.S. Cl.
CPC ......... H04B 7/0626 (2013.01); H04B 7/0639 (2013.01); H04L 1/0026 (2013.01); H04L 5/0057 (2013.01)

(58) Field of Classification Search
CPC .. H04B 7/0626; H04B 7/0639; H04B 7/0486; H04L 1/0026; H04L 5/0057; H04L 1/0031; H04L 1/0072; H04W 52/16; H04W 52/267; H04W 52/146; H04W 52/00

USPC ......................................... 375/329; 370/329
See application file for complete search history.

(56) References Cited

U.S. PATENT DOCUMENTS

2012/0113831 A1*  5/2012  Pelletier ............... H04L 5/0058
                                                  370/252
2013/0010634 A1*  1/2013  Lim ....................... H04L 5/006
                                                  370/252

FOREIGN PATENT DOCUMENTS

| CN | 101409894 A | 4/2009 |
|---|---|---|
| CN | 102263617 A | 11/2011 |
| CN | 104350790 A | 2/2015 |
| CN | 106416389 A | 2/2017 |
| WO | 2012020990 A2 | 2/2012 |
| WO | 2016163855 A1 | 10/2016 |

OTHER PUBLICATIONS

LG Electronics, Discussion on UCI transmission on sPUSCH. 3GPP TSG RAN WG1 Meeting #88bis, Spokane, USA Apr. 3-7, 2017, R1-1704832, 5 pages.

* cited by examiner

*Primary Examiner* — Fitwi Y Hailegiorgis
(74) *Attorney, Agent, or Firm* — Rimon PC

(57) ABSTRACT

This application discloses a data transmission solution. A terminal device generates channel state information and data for transmission in a data channel. The transmit power of the data channel is determined based on the number of bits used to transmit the data and the number of bits used to transmit the channel state information. The solution of this application reduces bit error probability and improves data decoding accuracy.

17 Claims, 3 Drawing Sheets

WIRELESS COMMUNICATION METHOD AND WIRELESS COMMUNICATIONS APPARATUS

CROSS-REFERENCE TO RELATED APPLICATIONS

This application is a continuation of International Application No. PCT/CN2017/110736, filed on Nov. 13, 2017, the disclosure of which is hereby incorporated by reference in its entirety.

TECHNICAL FIELD

This application relates to the field of wireless communications technologies, and in particular, to a wireless communication method and a wireless communications apparatus.

BACKGROUND

MIMO (Multiple Input and Multiple Output) technology is widely used in LTE (Long Term Evolution) systems. When a base station can obtain all or a part of downlink channel state information, a precoding technology may be used to improve signal transmission quality or a signal transmission rate. In a TDD (time division duplexing) system, there is reciprocity between uplink and downlink radio channels, and a downlink precoding weighting vector can be estimated based on the uplink channel. However, in an FDD (frequency division duplexing) system, because an uplink carrier frequency is different from a downlink carrier frequency, an uplink channel cannot be used to obtain a downlink weighting vector. In an LTE FDD system, a precoding weighting matrix is usually obtained by feeding back a precoding indicator by a terminal user.

An LTE standard supports an aperiodic channel state information (A-CSI) feedback. To be specific, a base station device sends an indication to a terminal device over a downlink control channel, to instruct the terminal device to feed back A-CSI at an uplink time point specified in a protocol or set by the base station. If the A-CSI and uplink data of the terminal device are sent in a same subframe, the A-CSI and uplink data share a time-frequency resource allocated by the base station device to the terminal device. In LTE, the bit quantity of the A-CSI varies with the rank indicator (RI) determined by the terminal device through measurement. A change in the bit quantity of the A-CSI causes a change in the quantity of resources used to carry the A-CSI, and further causes a change in the quantity of resources used to transmit the data. Because the bit quantity of the A-CSI varies slightly with the RI, adjustment of transmit power of a data channel in LTE is not affected.

A MIMO system is also applied to new radio (New Radio, NR). In addition, a structure of a high-precision codebook (codebook) is defined in NR MIMO. The high-precision codebook defined in NR may be introduced in an LTE system. However, for a high-precision codebook, the terminal device needs to feed back a large quantity of bits of a precoding matrix indicator (PMI). For example, when the system bandwidth includes 10 subbands, for the high-precision codebook, a PMI needs to be fed back for each subband, and if the rank is 2, the PMI of approximately 540 bits needs to be fed back; and when the rank is 1, the PMI of 270 bits needs to be fed back. When the terminal device sends the A-CSI and the data over an uplink data channel, a drastic change in the bit quantity of the A-CSI causes a drastic change in the amount of resources actually used to carry the data. Consequently, the bit error probability of the data channel fluctuates greatly.

SUMMARY

Embodiments of the present invention provide a wireless communication method and a wireless communications apparatus that address the problems described above.

According to a first aspect, a wireless communication method is provided. In the method, channel state information and data are generated. The channel state information and the data are sent over a data channel in a same time unit, where transmit power of the data channel is associated with a bit quantity of the data and a bit quantity of the channel state information.

According to the foregoing method, the transmit power of the data channel varies with the bit quantity of the data and the CSI that are carried on the data channel. This ensures that the bit error probability of the data channel can satisfy a system requirement.

According to a second aspect, a wireless communications apparatus is provided. The apparatus includes a processor and a transceiver.

The processor is configured to generate channel state information and data. The transceiver is configured to send the channel state information (CSI) and the data over a data channel in a same time unit, where transmit power of the data channel is associated with a bit quantity of the data and a bit quantity of the CSI.

In an example, that the transmit power is associated with the bit quantity of the data and the bit quantity of the channel state information includes:

the transmit power is directly proportional to bits per resource element (BPRE), where the BPRE is a ratio of a first bit quantity to $N_{RE}$, the first bit quantity is a sum of the bit quantity of the data and a first equivalent bit quantity of the channel state information, $N_{RE}$ is a quantity of resource elements that carry the channel state information and the data, the first equivalent bit quantity of the channel state information is $\lceil O_{CSI} \times \beta \rceil$, $O_{CSI}$ is the bit quantity of the channel state information, and $\beta$ is a multiplication factor. A product of the bit quantity of the CSI information and the multiplication factor may be equivalent to an additional bit quantity of the data channel, to obtain a total equivalent quantity of bits carried on the PUSCH channel. A terminal device may determine the bit quantity of the CSI based on the CSI obtained through measurement, to further determine the total equivalent quantity of bits. In this way, the transmit power of the data channel can be related to the total equivalent quantity of bits, to ensure that a bit error probability of the data channel satisfies a system requirement.

In an example, that the transmit power is associated with the bit quantity of the data and the bit quantity of the channel state information includes:

the transmit power is directly proportional to bits per resource element (BPRE), where the BPRE is a ratio of a second bit quantity to $N_{RE}$, the second bit quantity is a sum of the bit quantity of the data and a second equivalent bit quantity of the channel state information, $N_{RE}$ is a quantity of resource elements that carry the channel state information and the data, the second equivalent bit quantity of the channel state information is $\lceil (O_{CSI} - O_{ref}) \times \beta \rceil$, $O_{CSI}$ is the bit quantity of the channel state information, $\beta$ is a multiplication factor, and $O_{ref}$ is a reference bit quantity of the channel state information. In addition, $O_{ref}$ is a bit quantity of the channel state information assumed when an access network device allocates a resource to the terminal device. If a bit quantity of the CSI actually measured by the terminal device is less than that assumed by the access network device, the terminal device may reduce the transmit power of the data channel, to save power. If a bit quantity of the CSI measured by the terminal device is greater than that assumed by the access network device, the UE may increase the transmit power, to ensure that a bit error probability of the data channel satisfies a requirement. Therefore, this approach can achieve a good tradeoff between the bit error probability and the transmit power of the data channel.

In an example, that the transmit power is associated with the bit quantity of the data and the bit quantity of the channel state information includes:

the transmit power is directly proportional to bits per resource element (BPRE), where the BPRE is a ratio of the bit quantity of the data to an equivalent quantity of resource elements that carry the data, the equivalent quantity of resource elements that carry the data is $N_{RE}-Q'$, $N_{RE}$ is a quantity of resource elements occupied by the channel state information and the data, and Q' is a positive integer. In this way, the transmit power of the data channel can be related to the resource actually occupied by the data, to ensure that a bit error probability of the data channel satisfies a system requirement.

In an example, Q' is a quantity of resource elements occupied by the channel state information. Optionally, Q' satisfies $Q'=\lceil(O_{CSI}-O_{ref})\times\beta\rceil$. $O_{CSI}$ is the bit quantity of the channel state information, $O_{ref}$ is a reference bit quantity of the channel state information, and β is a multiplication factor. $O_{ref}$ is a bit quantity of the channel state information assumed when an access network device allocates a resource to a terminal device. If a bit quantity of the CSI actually measured by the terminal device is less than that assumed by the access network device, the terminal device may reduce the transmit power of the data channel, to save power. If a bit quantity of the CSI measured by the terminal device is greater than that assumed by the access network device, the UE may increase the transmit power, to ensure that a bit error probability of the data channel satisfies a requirement. Therefore, this manner can achieve a good tradeoff between the bit error probability and the transmit power of the data channel.

In an example, before the channel state information and the data are sent, indication information is received from an access network device, where the indication information indicates $O_{ref}$.

In an example, the indication information includes a rank indicator. $O_{ref}$ is determined based on the indication information.

In an example, the transceiver is further configured to: before sending the channel state information and the data, receive indication information from an access network device, where the indication information indicates $O_{ref}$.

In an example, the processor is further configured to determine $O_{ref}$ based on the indication information.

According to a third aspect, a communications apparatus is provided. The communications apparatus is configured to perform the foregoing method. These functions may be implemented by hardware, or may be implemented by hardware executing corresponding software. The hardware or the software includes one or more units corresponding to the foregoing functions.

According to a fourth aspect, a computer storage medium including an instruction is provided. When the instruction is run on a computer, the computer is enabled to perform the foregoing method.

According to a fifth aspect, a computer program product including an instruction is provided. When the computer program product runs on a computer, the computer is enabled to perform the method described in the foregoing aspect.

According to a sixth aspect, this application provides a chip system. The chip system includes a processor, configured to support the foregoing communications apparatus in implementing the functions in the foregoing aspects, for example, generating or processing the data and/or channel state information in the foregoing method. In a possible design, the chip system may further include a memory. The memory is configured to store a program instruction and data that are necessary for a data transmission device. The chip system may include a chip or may include a chip and another discrete device.

According to the wireless communication method and the wireless communications apparatus provided in this application, the terminal device sends both the data and the CSI over one data channel. In addition, transmit power of the data channel is associated with both the bit quantity of the data and the bit quantity of the channel state information. This ensures that a bit error probability of the data channel can satisfy the system requirement.

DESCRIPTION OF EMBODIMENTS

The following describes the technical solutions in the embodiments of the present invention with reference to the accompanying drawings in the embodiments of the present invention. It should be noted that the technical solutions or features in the embodiments of the present invention may be mutually combined in the case of no conflict.

Figure 1:
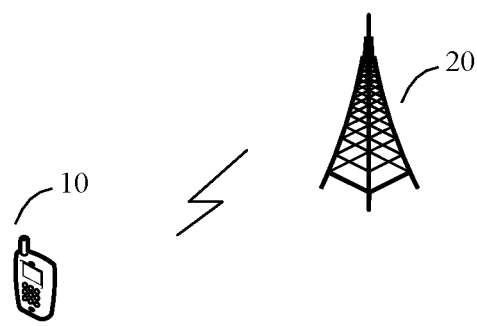
FIG. 1 is a schematic diagram of a wireless communications system according to an embodiment of this application.

FIG. 1 is a schematic diagram of a possible network architecture according to this application. The network architecture includes at least one terminal device 10 that communicates with an access network device 20 through a radio interface. For clarity, only one access network device and one terminal device are shown in the figure. A channel over which the access network device sends data to the terminal device is a downlink channel. A channel over which the terminal device sends data to the access network device is an uplink channel.

The terminal device is a device having a wireless transceiver function. The terminal device may be deployed on land, including an indoor or outdoor device, a handheld device, or a vehicle-mounted device, or may be deployed on the water (for example, a ship), or may be deployed in the air (for example, an airplane, a balloon, or a satellite). The terminal may be a mobile phone (mobile phone), a tablet (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home (smart home), or the like.

The access network device is a device that connects the terminal device to a wireless network. The access network device includes but is not limited to a gNB in 5G, an evolved NodeB (eNB), a radio network controller (RNC), a NodeB (NB), a base station controller (BSC), a base transceiver station (BTS), a home base station (for example, a home evolved nodeB or a home node B, HNB), a baseband unit (BBU), a gNodeB (gNB), a transmission point (TRP), a transmission point (TP), a mobile switching center, and the like. In addition, the access network device may further include a Wi-Fi access point (AP) and the like.

Figure 2:
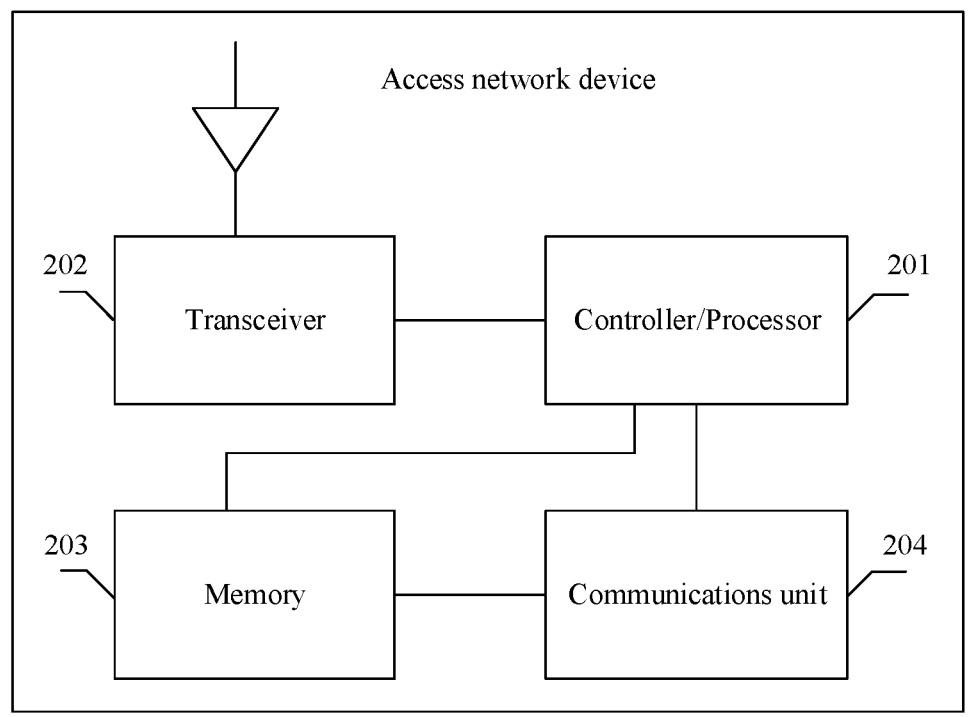
FIG. 2 is a schematic diagram of a possible structure of an access network device in the foregoing wireless communications system.

Further, FIG. 2 is a schematic diagram of a possible structure of the access network device 20. The access network device 20 may include a controller/processor 201 (the following uses the processor 201 as an example for description), and a transceiver 202. The controller/processor 201 is also referred to as a modem processor. The modem processor 201 may include a baseband processor (BBP) (not shown). The baseband processor processes a received digitized signal, to extract information or a data bit transmitted in the signal. Therefore, based on a requirement or an expectation, the BBP is usually implemented in one or more digital signal processors (DSP) in the modem processor 201 or implemented as a separated integrated circuit (IC).

The transceiver 202 may be configured to support the access network device 20 in receiving/sending information from/to the terminal device, and performing radio communication with the terminal device. On an uplink, an uplink signal from the terminal device is received by using an antenna, demodulated by the transceiver 202, and further processed by the processor 201, to restore service data and/or signaling information sent by the terminal device. On a downlink, service data and/or a signaling message are/is processed by the terminal device and modulated by the transceiver 202 to generate a downlink signal, and the downlink signal is transmitted to the terminal device by using an antenna. The access network device 20 may further include a memory 203. The memory 203 may be configured to store program code and/or data of the access network device 20. The transceiver 202 may include independent receiver and transmitter circuits, or may include one circuit configured to implement transmitting and receiving functions. The access network device 102 may further include a communications unit 204, configured to support the access network device 20 in communicating with another network entity, for example, configured to support the access network device 102 in communicating with a network device or the like in a core network.

Optionally, the access network device may further include a bus. The transceiver 202, the memory 203, and the communications unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
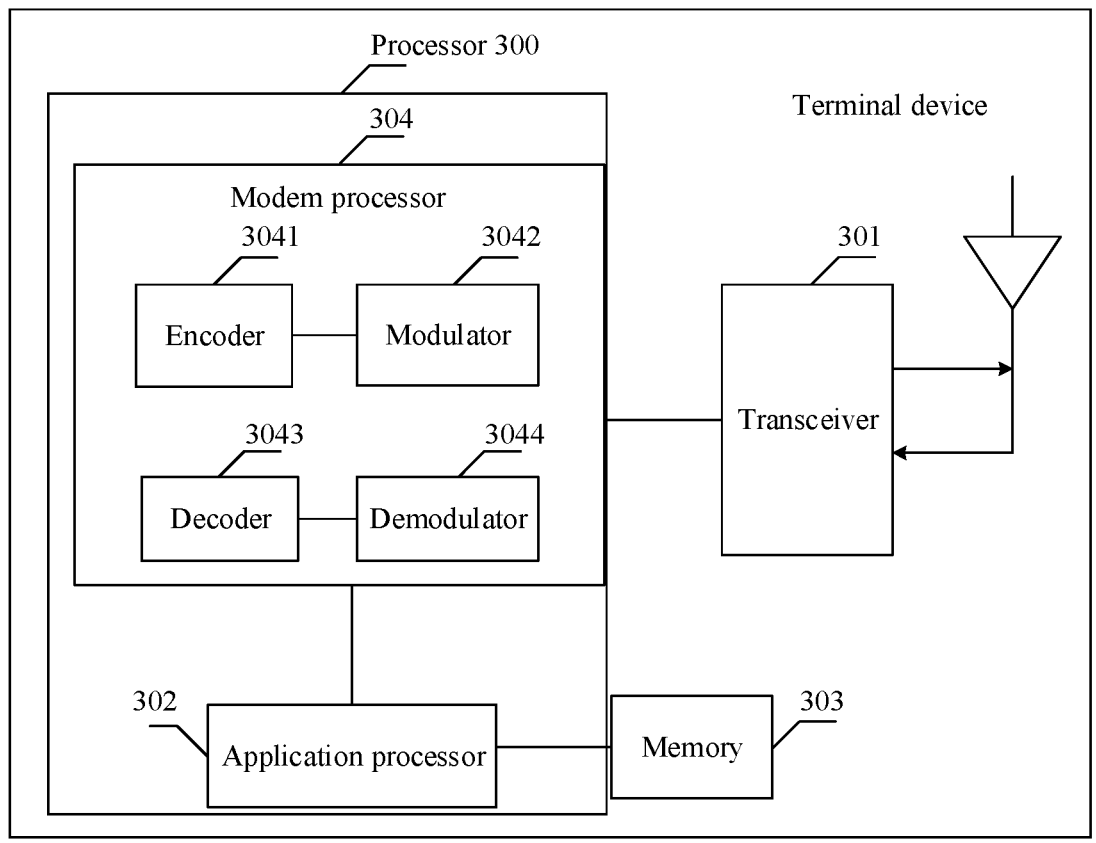
FIG. 3 is a schematic diagram of a possible structure of a terminal device in the foregoing wireless communications system.

FIG. 3 is a schematic diagram of a possible structure of a terminal device in the foregoing wireless communications system. The terminal device can perform the method provided in the embodiments of the present invention. The terminal device may be the terminal device 10 in FIG. 1. The terminal device includes a transceiver 301, a processor 300, and a memory 303. The processor 300 may include an application processor 302 and a modem processor 304.

The transceiver 301 may adjust (for example, analog-convert, filter, amplify, and up-convert) an output sample and generate an uplink signal. The uplink signal is transmitted to an access network device by using an antenna. On a downlink, the antenna receives a downlink signal transmitted by the access network device. The transceiver 301 may adjust (for example, filter, amplify, down-convert, and digitize) a signal received from the antenna and provide an input sample.

The modem processor 304 is also referred to as a controller/processor, and may include a baseband processor (BBP) (not shown). The baseband processor processes a received digitized signal, to extract information or a data bit transmitted in the signal.

In a design, the modem processor 304 may include an encoder 3041, a modulator 3042, a decoder 3043, and a demodulator 3044. The encoder 3041 is configured to encode a to-be-sent signal. For example, the encoder 3041 may be configured to receive service data and/or a signaling message that are/is to be sent on an uplink, and perform processing (for example, formatting, encoding, or interleaving) on the service data and the signaling message. The modulator 3042 is configured to modulate a signal output by the encoder 3041. For example, the modulator may perform processing such as symbol mapping and/or modulation on the signal (data and/or signaling) output by the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. These units perform processing based on a radio access technology used in a radio access network.

The modem processor 304 receives, from the application processor 302, digitized data that may represent voice, data, or control information, and processes the digitized data for transmission. The modem processor may support one or more of wireless communications protocols, such as LTE, new radio (NR), universal mobile telecommunications system (UMTS), and high speed packet access (HSPA), of a plurality of communications systems. Optionally, the modem processor 304 may further include one or more memories.

Optionally, the modem processor 304 and the application processor 302 may be integrated into one processor chip.

The memory 303 is configured to store program code (also referred to as a program, an instruction, software, or the like) and/or data that are/is used to support the terminal device in communication.

It should be noted that the memory 203 or the memory 303 may include one or more storage units. For example, the storage unit may be a storage unit that is in the processor 201, the modem processor 304, or the application processor 302 and that is configured to store program code, or may be an external storage unit independent of the processor 201, the modem processor 304, or the application processor 302, or may be a component including a storage unit in the processor 201, the modem processor 304, or the application processor 302 and an external storage unit independent of the processor 201, the modem processor 304, or the application processor 302.

The processor 201 and the modem processor 301 may be processors of a same type or processors of different types. For example, the processor 201 and the modem processor 304 each may be implemented as a central processing unit (CPU), a general-purpose processor, a digital signal processor (DSP), an application-specific integrated circuit (ASIC), a field programmable gate array (FPGA), another programmable logic device, a transistor logic device, a hardware component, another integrated circuit, or any combination thereof. The processor 201 and the modem processor 301 may implement or execute various example logical blocks, modules, and circuits described with reference to content disclosed in the embodiments of the present invention. Alternatively, the processor may be a combination of components implementing computing functions, for example, a combination of one or more microprocessors, a combination of a DSP and a microprocessor, or a system-on-a-chip (SOC).

A person skilled in the art can understand that various explanatory logical blocks, modules, circuits, and algorithms described with reference to the various aspects disclosed in this application may be implemented as electronic hardware, an instruction that is stored in a memory or another computer-readable medium and that is executed by a processor or another processing device, or a combination thereof. As an example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functionality for each particular application, but such implementation decisions shall not be construed as beyond the scope of the present invention.

In this application, one time unit may be one subframe, one slot, or one system frame. An implementation method performed in the time unit is similar to that performed in one subframe. However, the form of the time unit is not limited in this application.

In this application, a rank represents the quantity of columns of a precoding matrix. For example, if a precoding matrix W is a matrix having eight rows and two columns, the rank is 2.

In this application, that A is directly proportional to B means that as a value of B increases, a value of A also increases.

In this application, rounding up of A $\lceil A \rceil$ may be replaced by rounding down of A $\lfloor A \rfloor$.

In a MIMO system, a structure of a high-precision codebook is defined as follows.

A precoding matrix W is expressed by a formula (1):

$$W = W_1 \times W_2 \quad (1)$$

$W_1$ is a block diagonal matrix, each block matrix $[b_0^m \ldots b_{l-1}^m]$ includes I orthogonal two-dimensional discrete Fourier transform (Discrete Fourier Transform, DFT) vectors, and $$W_1 = \begin{bmatrix} b_0^m \ldots b_{l-1}^m & 0 \\ 0 & b_0^m \ldots b_{l-1}^m \end{bmatrix} \quad (2)$$

The beam vectors $b_j^m$ are orthogonal to each other, where i=0, I−1.

When a rank is 1, $W_2$ satisfies a formula (3):

$$W_2 = \begin{bmatrix} p_{0,0,0}^{(WB)} \cdot p_{0,0,0}^{(SB)} \cdot c_{0,0,0} \\ p_{0,0,1}^{(WB)} \cdot p_{0,0,1}^{(SB)} \cdot c_{0,0,1} \\ \vdots \\ p_{0,0,I-1}^{(WB)} \cdot p_{0,0,I-1}^{(SB)} \cdot c_{0,0,I-1} \\ p_{1,0,0}^{(WB)} \cdot p_{1,0,0}^{(SB)} \cdot c_{1,0,0} \\ p_{1,0,1}^{(WB)} \cdot p_{1,0,1}^{(SB)} \cdot c_{1,0,1} \\ \vdots \\ p_{1,0,I-1}^{(WB)} \cdot p_{1,0,I-1}^{(SB)} \cdot c_{1,0,I-1} \end{bmatrix} \quad (3)$$

When a rank is 1, $W_2$ satisfies a formula:

$$W_2 = \begin{bmatrix} p_{0,0,0}^{(WB)} \cdot p_{0,0,0}^{(SB)} \cdot c_{0,0,0} & p_{0,1,0}^{(WB)} \cdot p_{0,1,0}^{(SB)} \cdot c_{0,1,0} \\ p_{0,0,1}^{(WB)} \cdot p_{0,0,1}^{(SB)} \cdot c_{0,0,1} & p_{0,1,1}^{(WB)} \cdot p_{0,1,1}^{(SB)} \cdot c_{0,1,1} \\ \vdots & \vdots \\ p_{0,0,I-1}^{(WB)} \cdot p_{0,0,I-1}^{(SB)} \cdot c_{0,0,I-1} & p_{0,1,I-1}^{(WB)} \cdot p_{0,1,I-1}^{(SB)} \cdot c_{0,1,I-1} \\ p_{1,0,0}^{(WB)} \cdot p_{1,0,0}^{(SB)} \cdot c_{1,0,0} & p_{1,1,0}^{(WB)} \cdot p_{1,1,0}^{(SB)} \cdot c_{1,1,0} \\ p_{1,0,1}^{(WB)} \cdot p_{1,0,1}^{(SB)} \cdot c_{1,0,1} & p_{1,1,0}^{(WB)} \cdot p_{1,1,0}^{(SB)} \cdot c_{1,1,0} \\ \vdots & \vdots \\ p_{1,0,I-1}^{(WB)} \cdot p_{1,0,I-1}^{(SB)} \cdot c_{1,0,I-1} & p_{1,1,I-1}^{(WB)} \cdot p_{1,1,I-1}^{(SB)} \cdot c_{1,1,I-1} \end{bmatrix} \quad (4)$$

In the formulas (3) and (4), $p_{r,l,i}^{(WB)}$ and $p_{r,l,i}^{(WB)}$ represent amplitude information of a wideband and amplitude information of a subband respectively, where $p_{r,l,i}^{(WB)} \in \{1, \sqrt{0.5}$ $\sqrt{0.25}$ $\sqrt{0.125}$ $\sqrt{0.0625}$ $\sqrt{0.0313}$ $\sqrt{0.0313}$ $\sqrt{0.0156}$ $0\}$ and $p_{r,l,i}^{(SB)} \in \{1 \sqrt{0.5}\}$. $c_{r,l,i}$ represents phase information. For example, a value range of $c_{r,l,i}$ may be $$c_{r,l,i} \in \{e^{j\frac{\pi n}{2}}, n = 0, 1, 2, 3\},$$

or may be $$c_{r,l,i} \in \{e^{j\frac{\pi n}{4}}, n = 0, 1, 2, 3, \ldots, 7\},$$

where r represents an index of a polarization direction dimension of an antenna, l represents a sequence number of a data layer, and i represents a sequence number of the beam vector in $W_1$.

For the high-precision codebook, a bit quantity of a PMI fed back by a terminal device varies greatly with the rank. When the terminal device feeds back the PMI based on the rank of 1, the parameter I in the formula (2) is 4, and the terminal device feeds back the PMI for 10 subbands, the terminal device needs to feed back the PMI of approximately 270 bits. When the terminal device feeds back the PMI based on the rank of 2, the terminal device needs to feed back the PMI of approximately 540 bits in the same condition. When the terminal device feeds back the rank and the PMI in an aperiodic channel state information (CSI) feedback mode, the rank and the PMI are sent together with data to an access network device over an uplink data channel. However, a resource of the uplink data channel that carries the rank and the PMI is allocated by the access network device to the terminal device. In this case, when allocating the resource, the access network device does not know the rank to be sent by the terminal device to the access network device. Therefore, the access network device can estimate a bit quantity of CSI only with reference to a previous CSI reporting result, and allocate the resource to the terminal device based on the estimated bit quantity of the CSI and a bit quantity of the data that needs to be sent by the UE. The bit quantity of the CSI estimated by the access network may not match a bit quantity of the CSI that actually needs to be reported by the terminal device. This mismatch is more serious during a high-precision codebook-based feedback. For example, the access network device estimates that the rank measured by the terminal device is 1, and then allocates U resource elements to the terminal device, where U1 resource elements are used to transmit the CSI, U2 resource elements are used to transmit the data, and U1+U2=U. However, the rank measured by the terminal device is actually 2. Consequently, a quantity of resource elements used to transmit the CSI changes to U1+Q, and a quantity of resource elements used to transmit the data changes to U2−Q. The change in these resources results in an increase in the actual coding rate of transmitted data. If the transmit power for the data is not adjusted accordingly, the bit error probability of the data increases.

Based on the communications system shown in FIG. 1, a data transmission method in wireless communications provided in this application is intended to resolve the foregoing technical problem.

Figure 4:
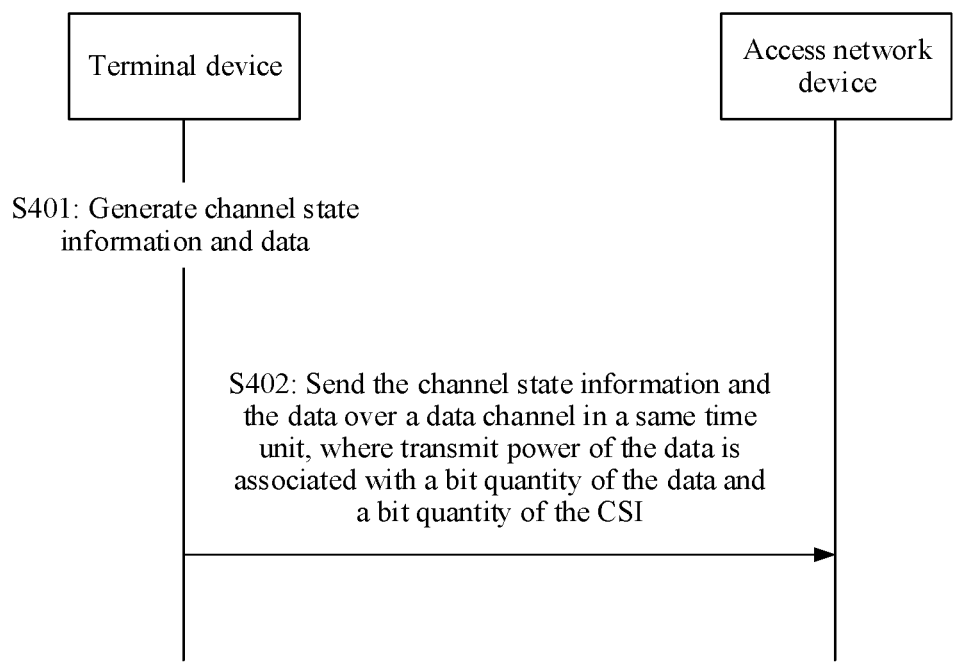
FIG. 4 is a schematic diagram of a data transmission method in wireless communications according to this application.

FIG. 4 is a schematic diagram of a wireless communication method according to an embodiment of this application. In FIG. 4, the wireless communication method provided in this application is described by using an example in which a transmission device is a terminal device and a receiving device is an access network device.

Step 401: The terminal device generates channel state information and data.

In step 401, the terminal device generates the channel state information and the data. The data may be service data. The data is sent to the access network device over an uplink data channel. The channel state information may include information such as a rank indicator (rank indicator, RI), a channel quality indicator (channel quality indicator, CQI), and a PMI.

In an example, the channel state information includes a PMI for a high-precision codebook. The channel state information may further include the RI.

Figure 5:
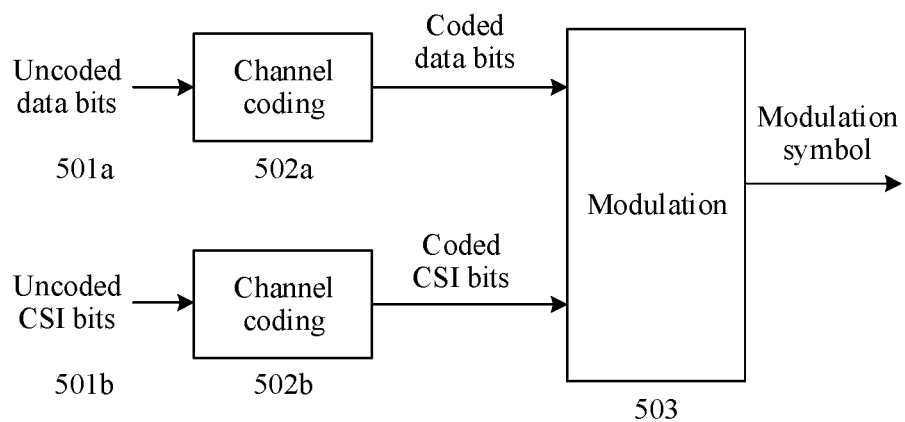
FIG. 5 is a schematic diagram of processing data and channel state information by a terminal device according to this application.

FIG. 5 shows a possible manner in which the terminal device processes the data and the channel state information after generating the data and the channel state information and before sending the data and the CSI.

In steps 501a and 501b in FIG. 5, uncoded data bits are bits of the data generated by the terminal device, and uncoded CSI bits are bits of the channel state information generated by the terminal device.

In steps 502a and 502b, the terminal device performs channel coding on the uncoded data bits to obtain coded data bits. The terminal device performs channel coding on the uncoded CSI bits to obtain coded CSI bits.

Step 503: The terminal device modulates the coded data bits and CSI bits to obtain a modulation symbol.

Step 401 and the steps in FIG. 5 may be implemented by the processor 300 of the terminal device. The application processor 302 in the processor 300 may implement steps 501a and 501b. The modem processor 304 implements steps 502a, 502b, and 503 in FIG. 5.

Step 402: Send the channel state information and the data over a data channel in a same time unit, where the transmit power of the data channel is determined in accordance with the bit quantity of the data and the bit quantity of the CSI. The transmit power of the data channel is associated with both the bit quantity of the data and the bit quantity of the channel state information. This can ensure that a bit error probability of the data channel can satisfy a system requirement.

One time unit may be one subframe, one slot, or the like. For example, one time unit is one subframe in LTE. One normal subframe in LTE includes two slots. For a downlink channel, each slot has seven orthogonal frequency division multiplexing (OFDM) symbols. For an uplink channel, each slot has seven discrete Fourier transform (DFT) spread orthogonal frequency division multiplexing (DFT-spread-OFDM, DFT-s-OFDM) symbols.

One normal subframe includes 14 or 12 OFDM/DFT-s-OFDM symbols in total. A size of an RB (resource block) is defined in LTE. One RB includes 12 subcarriers in frequency domain, and is half a subframe (one slot) in time domain, that is, includes seven or six OFDM/DFT-s-OFDM symbols. The RB includes seven OFDM/DFT-s-OFDM symbols for a normal cyclic prefix (CP) length, and includes six OFDM/DFT-s-OFDM symbols for an extended cyclic prefix length. A subcarrier in an OFDM/DFT-s-OFDM symbol is referred to as a resource element (RE). Therefore, the RB includes 84 or 72 REs. In one subframe, a pair of RBs in two slots is referred to as a resource block pair, namely, an RB pair. In actual transmission, an RB pair used for a physical resource is also referred to as a PRB pair (physical resource block pair).

The data channel may be a physical uplink shared channel (PUSCH) in LTE. For example, in an LTE system, the terminal device sends the channel state information and the data over the PUSCH in one subframe.

In an example, that the transmit power is associated with the bit quantity of the data and the bit quantity of the channel state information includes:

the transmit power is directly proportional to bits per resource element (BPRE), where the BPRE is a ratio of a first bit quantity to $N_{RE}$, the first bit quantity is a sum of the bit quantity of the data and a first equivalent bit quantity of the channel state information. The bit quantity of the data may be a quantity of the coded data bits in FIG. 5. $N_{RE}$ is a quantity of resource elements that carry the channel state information and the data, the first equivalent bit quantity of the channel state information is $\lceil O_{CSI} \times \beta \rceil$, $O_{CSI}$ is the bit quantity of the channel state information, and $\beta$ is a multiplication factor. The bit quantity of the channel state information may be a quantity of the uncoded CSI bits in FIG. 5, or $O_{CSI}$ may be a sum of a quantity of the uncoded CSI bits and a quantity of cyclic redundancy check (Cyclic Redundancy Check, CRC for short) bits. If Reed-Muller coding is performed on the channel state information, there is no CRC. In other words, the quantity of CRC bits is 0. If convolutional coding, turbo coding, or polar coding is performed, a CRC is required. $\lceil O_{CSI} \times \beta \rceil$ indicates that the bit quantity of the CSI is converted into an equivalent bit quantity of data. For example, if $O_{CSI}$=100 and $\beta$=1.5, $\lceil O_{CSI} \times \beta \rceil$=150. 100 coded CSI bits are repeated once to obtain 150 bits, and then the 150 bits are sent over the data channel.

For example, the BPRE is the ratio of the first bit quantity to $N_{RE}$, and may be expressed as:

BPRE=$(O_{data}+\lceil O_{CSI} \times \beta \rceil)/N_{RE}$ $O_{data}$ is the bit quantity of the data. $O_{data}+\lceil O_{CSI} \times \beta \rceil$ is a total quantity of bits sent over the data channel.

In another example, the BPRE is a sum of the ratio of the first bit quantity to $N_{RE}$ and a ratio of a bit quantity of HARQ-ACK information to $N_{RE}$, and may be expressed as:

BPRE=$(O_{data}+\lceil O_{CSI} \times \beta \rceil)/N_{RE}+(\lceil O_{ack} \times \beta_{ack} \rceil)/N_{RE}$ $O_{ack}$ represents the bit quantity of the HARQ-ACK information, and $\beta_{ack}$ is a multiplication factor associated with the bit quantity of the HARQ-ACK information.

Because a product of the bit quantity of the CSI information and the multiplication factor may be equivalent to an additional bit quantity of the data channel, the terminal device obtains a total equivalent quantity of bits carried on the PUSCH channel. The terminal device may determine the bit quantity of the CSI based on the CSI obtained through measurement, to further determine the total equivalent quantity of bits. In this way, the transmit power of the data channel can be related to the total equivalent quantity of bits, to ensure that a bit error probability of the data channel satisfies a system requirement.

Optionally, the channel state information includes first-type channel state information and second-type channel state information. Different multiplication factors are configured for the first-type channel state information and the second-type channel state information. It is assumed that a quantity of uncoded bits of the first-type channel state information is $O_{CSI,1}$, and a corresponding multiplication factor is $\beta_1$; a quantity of uncoded bits of the second-type channel state information is $O_{CSI,2}$, and a corresponding multiplication factor is $\beta_2$. In this case, the ratio of the first bit quantity to $N_{RE}$ may be expressed as:

BPRE=$(O_{data}+|O_{CSI,1} \times \beta_1|+|O_{CSI,2} \times \beta_2|)/N_{RE}$

The channel state information usually includes a rank indicator (RI), a precoding matrix indicator, and a channel quality indicator. The channel state information may usually be classified into two types. For example, the RI is the first-type channel state information, and the PMI and the CQI are the second-type channel state information. A multiplication factor associated with the first-type CSI is different from that associated with the first-type CSI. Therefore, in this example, the BPRE is associated with the two parts of the CSI and the corresponding multiplication factors, so that the transmit power can be more accurately determined. Optionally, the first-type CSI includes the RI and a CQI for a first codeword, and the second-type CSI includes the PMI and remaining CQIs.

In an example, that the transmit power is associated with the bit quantity of the data and the bit quantity of the channel state information includes:

the transmit power is directly proportional to bits per resource element (BPRE), where the BPRE is a ratio of a second bit quantity to $N_{RE}$, the second bit quantity is a sum of the bit quantity of the data and a second equivalent bit quantity of the channel state information, $N_{RE}$ is a quantity of resource elements that carry the channel state information and the data, the second equivalent bit quantity of the channel state information is $\lceil O_{CSI}-O_{ref}) \times \beta \rceil$, $O_{CSI}$ is the bit quantity of the channel state information, $\beta$ is a multiplication factor, and $O_{ref}$ is a reference bit quantity of the channel state information. In addition, $O_{ref}$ is a bit quantity of the channel state information assumed when the access network device allocates a resource to the terminal device. If a bit quantity of the CSI actually measured by the terminal device is less than that assumed by the access network device, the terminal device may reduce the transmit power of the data channel, to save power. If a bit quantity of the CSI measured by the terminal device is greater than that assumed by the access network device, the UE may increase the transmit power, to ensure that a bit error probability of the data channel satisfies a requirement. Therefore, this approach can achieve a good tradeoff between the bit error probability and the transmit power of the data channel.

For example, the BPRE is the ratio of the second bit quantity to $N_{RE}$, and may be expressed as:

BPRE=$(O_{data}+|(O_{CSI}-O_{ref}) \times \beta_1|)/N_{RE}$

Optionally, the channel state information may be classified into first-type channel state information and second-type channel state information. Different multiplication factors are configured for the first-type channel state information and the second-type channel state information. It is assumed that a quantity of uncoded bits of the first-type channel state information is $O_{CSI,1}$, and a corresponding multiplication factor is $\beta_1$; a quantity of uncoded bits of the second-type channel state information is $O_{CSI,2}$, and a corresponding multiplication factor is $\beta_2$. In this case, the ratio of the second equivalent bit quantity of the channel state information to $N_{RE}$ may be expressed as:

BPRE=$(O_{data}+|(O_{CSI,1}-O_{ref}) \times \beta_1|+|(O_{CSI,2}) \times \beta_2|)/N_{RE}$ or BPRE=$(O_{data}+|(O_{CSI,1}) \times \beta_1|+|(O_{CSI,2}-O_{ref}) \times \beta_2|)/N_{RE}$ In an example, that the transmit power is associated with the bit quantity of the data and the bit quantity of the channel state information includes:

the transmit power is directly proportional to bits per resource element (BPRE), where the BPRE is a ratio of the bit quantity of the data to an equivalent quantity of resource elements that carry the data, the equivalent quantity of resource elements that carry the data is $N_{RE}-Q'$, $N_{RE}$ is a quantity of resource elements occupied by the channel state information and the data, and Q' is a positive integer. For example, the BPRE is the ratio of the bit quantity of the data to the equivalent quantity of resource elements that carry the data, and may be expressed as:

BPRE=$(O_{data})/(N_{RE}-Q')$

In this way, the transmit power of the data channel can be related to the resource actually occupied by the data, to ensure that a bit error probability of the data channel satisfies a system requirement.

In an example, Q' is a quantity of resource elements occupied by the channel state information.

$$Q' = \min\left(\left\lceil \frac{O_{CSI} \cdot N_{RE} \cdot \beta}{\sum_{r=0}^{C-1} K_r} \right\rceil, N_{max}\right), \text{ where } \sum_{r=0}^{C-1} K_r$$

represents the bit quantity of the data, $K_r$ represents a bit quantity of a code block r, C represents a quantity of code blocks of the data carried on the data channel, and $N_{max}$ represents a maximum quantity of resource elements used to carry the CSI. $O_{CSI}$ represents the quantity of uncoded bits of the channel state information. If a coding manner corresponding to the CSI requires a CRC, $O_{CSI}$ is a sum of the bit quantity of the channel state information and a quantity of CRC bits. $N_{RE}$–Q' is equivalent to a quantity of resource elements occupied by data bits.

Optionally, the channel state information includes first-type channel state information and second-type channel state information. A quantity of uncoded bits of the first-type channel state information is $O_{CSI,1}$, a corresponding multiplication factor is $\beta_1$, and a quantity of resource elements occupied by the first-type channel state information is $$Q'_1 = \min\left(\left\lceil \frac{O_{CSI,1} \cdot N_{RE} \cdot \beta_1}{\sum_{r=0}^{C-1} K_r} \right\rceil, N_{max,1}\right).$$

A quantity of uncoded bits of the second-type channel state information is $O_{CSI,2}$, a corresponding multiplication factor is $\beta_2$, and a quantity of resource elements occupied by the second-type channel state information is $$Q'_2 = \min\left(\left\lceil \frac{O_{CSI,2} \cdot N_{RE} \cdot \beta_2}{\sum_{r=0}^{C-1} K_r} \right\rceil, N_{max,2}\right).$$

In addition, $Q'=(Q'_1+Q'_2)$. $N_{max,1}$ and $N_{max,2}$ are a maximum quantity of resource elements used to carry the first-type channel state information and a maximum quantity of resource elements used to carry the second-type channel state information, respectively.

Optionally, Q' may alternatively be expressed as $Q'=Q'_1+Q'_2+Q'_3$. $Q'_1$ and $Q'_2$ are defined as described above, and $Q'_3$ is used to represent an equivalent quantity of resource elements that carry hybrid automatic repeat request-acknowledgement (HARQ-ACK) information.

$$Q'_3 = \min\left(\left\lceil \frac{O_{ack} \cdot N_{RE} \cdot \beta_3}{\sum_{r=0}^{C-1} K_r} \right\rceil, N_{max,3}\right),$$

where $O_{ack}$ represents a bit quantity of the HARQ-ACK information, $\beta_3$ represents a multiplication factor associated with the HARQ-ACK information, and $N_{max,3}$ represents a maximum quantity of resource elements used to carry the HARQ-ACK information.

In an example, Q' satisfies $Q'=\lceil O_{CSI}-O_{ref})\times\beta\rceil$.

Optionally, $Q'=(Q'_1+Q'_2)$. The channel state information includes first-type channel state information and second-type channel state information. A quantity of uncoded bits of the first-type channel state information is $O_{CSI,1}$, a corresponding multiplication factor is $\beta_1$, and a quantity of resource elements occupied by the first-type channel state information is $$Q'_1 = \min\left(\left\lceil \frac{O_{CSI,1} \cdot N_{RE} \cdot \beta_1}{\sum_{r=0}^{C-1} K_r} \right\rceil, N_{max,1}\right)$$

A quantity of uncoded bits of the second-type channel state information is $O_{CSI,2}$, a corresponding multiplication factor is $\beta_2$, and a quantity of resource elements occupied by the first-type channel state information is $$Q'_2 = \min\left(\left\lceil \frac{(O_{CSI,2} - O_{ref}) \cdot N_{RE} \cdot \beta_2}{\sum_{r=0}^{C-1} K_r} \right\rceil, N_{max,2}\right).$$

In this embodiment, a same parameter has a same physical meaning. For example, the parameters $O_{data}$, $O_{CSI}$, and $O_{CSI}$ have a same physical meaning in the foregoing formulas.

In an example, $$O_{data} = \sum_{r=0}^{C-1} K_r,$$

where C is a quantity of codewords for channel coding. $K_r$ is a bit quantity of an $r^{th}$ codeword after the channel coding.

In an example, before sending the channel state information and the data, the terminal device receives indication information from the access network device, where the indication information indicates $O_{ref}$.

In an example, the indication information includes a rank indicator. The terminal device determines $O_{ref}$ based on the indication information. The bit quantity of the CSI is mainly related to the RI. If the access network device notifies the terminal device of an RI assumed when a PUSCH resource is allocated to the terminal device, the UE may estimate a bit quantity of the CSI assumed by the access network device in the resource allocation process. For example, in a high-precision codebook-based feedback scenario, if the access network device notifies the terminal device that an assumed rank is 1, the terminal device may deduce that the bit quantity of the CSI assumed by the access network device is 270.

In an example, the data channel is a PUSCH, and the transmit power of the data channel is $P_{PUSCH,c}(i)$, which satisfies:

$$P_{PUSCH,c}(i) = \min\left\{ \begin{array}{l} P_{CMAX,c}(i), \\ 10\log_{10}(M_{pusch,c}(i)) + P_{O\_PUSCH,c}(j) + \alpha_c(j) \cdot PL_c + \Delta_{TF,c}(i) + f_c(i) \end{array} \right\}$$

$P_{CMAX,c}$ represents maximum transmit power of the terminal device in a cell c. $M_{PUSCH,c}(i)$ represents a quantity of PRB pairs occupied for sending the PUSCH by the terminal device, and $P_{O\_PUSCId}(j)$ is a value determined by a higher layer configuration parameter. $\alpha_c(j)$ is a value determined by a higher layer parameter, and $\alpha_c(j)\leq 1$. $PL_c$ is a path loss measured by the terminal device. $\Delta_{TF,c}(i)=10 \log_{10}((2^{BPRE \cdot K_s}-1)\cdot\beta_{TF})$, where Ks is the higher layer configuration parameter. For example, Ks=1.25. $\beta_{TF}$ is a real number.

Figure 6:
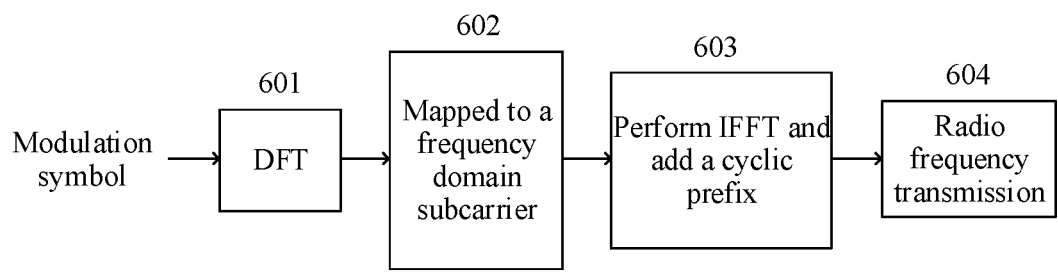
FIG. 6 is a schematic diagram of data transmission according to this application.

FIG. 6 is a schematic diagram of sending the control information and the data by the terminal device.

Step 402 may be implemented by the transceiver 301 of the terminal device.

In step 601, DFT is performed on the modulation symbol to obtain a DFT-transformed symbol. For example, there are N modulation symbols, and N DFT-transformed symbols are obtained after N-point DFT.

In step 602, the DFT-transformed symbol is mapped to a frequency domain subcarrier, to obtain a mapped symbol.

In step 603, IFFT is performed on the mapped symbol, and a cyclic prefix is added, to form a time domain signal.

In step 604, the time domain signal is sent on a radio frequency.

The modulation symbol in FIG. 6 is the modulation symbol generated in FIG. 5. Steps 601, 602, and 603 may be implemented by the processor 300, and step 604 may be implemented by the transceiver 301.

Correspondingly, the access network device receives the data and the CSI that are sent by the terminal device. A transceiver of the access network device may receive the data and the CSI. The controller/processor 201 of the access network device processes the received signal to obtain the uncoded data bits and the uncoded CSI bits.

According to the wireless communication method provided in this application, the terminal device sends both the data and the CSI over one data channel. In addition, transmit power of the data channel is associated with both the bit quantity of the data and the bit quantity of the channel state information. This can ensure that a bit error probability of the data channel can satisfy a system requirement.

An example of the present invention further provides an apparatus (for example, an integrated circuit, a wireless device, or a circuit module), configured to implement the foregoing method. An apparatus for implementing a power tracker and/or a power generator described in this specification may be an independent device or may be a part of a larger device. The device may be: (i) an independent IC, (ii) a set of one or more ICs, where the set may include a memory IC configured to store data and/or an instruction, (iii) an RFIC such as an RF receiver or an RF transmitter/receiver, (iv) an ASIC such as a mobile station modem, (v) a module that can be embedded in another device, (vi) a receiver, a cellular phone, a wireless device, a handheld phone, or a mobile unit, or (vii) others.

The method and apparatus that are provided in the embodiments of the present invention may be applied to a terminal device or an access network device (which may be collectively referred to as a wireless device). The terminal device, the access network device, or the wireless device may include a hardware layer, an operating system layer running above the hardware layer, and an application layer running above the operating system layer. The hardware layer includes hardware such as a central processing unit (CPU), a memory management unit (MMU), and an internal memory (also referred to as a main memory). The operating system may be any one or more types of computer operating systems, for example, a Linux operating system, a Unix operating system, an Android operating system, an iOS operating system, and a Windows operating system, that implement service processing by using a process. The application layer includes applications such as a browser, an address book, word processing software, and instant messaging software. In addition, a specific structure of an execution body of the method is not limited in the embodiments of the present invention, provided that the execution body can perform communication based on the signal transmission method in the embodiments of the present invention by running a program that records code of the method in the embodiments of the present invention. For example, the wireless communication method in the embodiments of the present invention may be performed by the terminal device or the access network device, or a functional module that is in the terminal device or the access network device and that can invoke and execute a program.

This application further provides a computer storage medium. The computer-readable storage medium stores an instruction. When the instruction is run on a computer, the computer is enabled to perform the method performed by the terminal device in the foregoing method embodiment.

An embodiment of this application further provides a computer program product, including an instruction. When the computer program is executed by a computer, the instruction enables the computer to execute functions executed by the terminal device in the foregoing method.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A wireless communication method, comprising:
generating channel state information and data; and
sending the channel state information and the data over a data channel in a same time unit, wherein transmit power of the data channel is determined based on a bit quantity of the data and a bit quantity of the channel state information;
wherein the transmit power is directly proportional to bits per resource element (BPRE), wherein the BPRE is a ratio of a first bit quantity to $N_{RE}$, the first bit quantity is a sum of the bit quantity of the data and a first equivalent bit quantity of the channel state information, $N_{RE}$ is a quantity of resource elements that carry the channel state information and the data, the first equivalent bit quantity of the channel state information is $[O_{CSI} \times \beta]$, $O_{CSI}$ is the bit quantity of the channel state information, and $\beta$ is a multiplication factor.

2. The method according to claim 1, wherein
the transmit power is directly proportional to bits per resource element (BPRE), wherein the BPRE is a ratio of a second bit quantity to $N_{RE}$ the second bit quantity is a sum of the bit quantity of the data and a second equivalent bit quantity of the channel state information, $N_{RE}$ is a quantity of resource elements that carry the channel state information and the data, the second equivalent bit quantity of the channel state information is $\lceil (O_{CSI} - O_{ref}) \times \beta \rceil$, $O_{CSI}$ is the bit quantity of the channel state information, $\beta$ is a multiplication factor, and $O_{ref}$ is a reference bit quantity of the channel state information.

3. The method according to claim 2, comprising:
before the sending the channel state information and the data, receiving indication information from an access network device, wherein the indication information indicates $O_{ref}$.

4. The method according to claim 3, wherein
the indication information comprises a rank indicator; and $O_{ref}$ is determined based on the indication information.

5. The method according to claim 1, wherein
the transmit power is directly proportional to bits per resource element (BPRE), wherein the BPRE is a ratio of the bit quantity of the data to an equivalent quantity of resource elements that carry the data, the equivalent quantity of resource elements that carry the data is $N_{RE} - Q'$, $N_{RE}$ is a quantity of resource elements occupied by the channel state information and the data, and $Q'$ is a positive integer.

6. The method according to claim 5, wherein $Q'$ is a quantity of resource elements occupied by the channel state information; or
$Q'$ satisfies $Q' = \lceil (O_{CSI} - O_{ref}) \times \beta \rceil$, wherein $O_{CSI}$ is the bit quantity of the channel state information, $O_{ref}$ is a reference bit quantity of the channel state information, and $\beta$ is a multiplication factor.

7. A wireless communication apparatus, comprising:
a processor, configured to generate channel state information and data; and
a transceiver, configured to send the channel state information and the data over a data channel in a same time unit, wherein transmit power of the data channel is determined based on a bit quantity of the data and a bit quantity of the channel state information;

wherein the transmit power is directly proportional to bits per resource element (BPRE), wherein the BPRE is a ratio of a first bit quantity to $N_{RE}$, the first bit quantity is a sum of the bit quantity of the data and a first equivalent bit quantity of the channel state information, $N_{RE}$ is a quantity of resource elements that carry the channel state information and the data, the first equivalent bit quantity of the channel state information is $\lceil O_{CSI} \times \beta \rceil$, $O_{CSI}$ is the bit quantity of the channel state information, and $\beta$ is a multiplication factor.

8. The wireless communication apparatus according to claim 7, wherein
the transmit power is directly proportional to bits per resource element (BPRE), wherein the BPRE is a ratio of a second bit quantity to $N_{RE}$, the second bit quantity is a sum of the bit quantity of the data and a second equivalent bit quantity of the channel state information, $N_{RE}$ is a quantity of resource elements that carry the channel state information and the data, the second equivalent bit quantity of the channel state information is $\lceil (O_{CSI} - O_{ref}) \times \beta \rceil$, $O_{CSI}$ is the bit quantity of the channel state information, $\beta$ is a multiplication factor, and $O_{ref}$ is a reference bit quantity of the channel state information.

9. The wireless communication apparatus according to claim 7, wherein
the transmit power is directly proportional to bits per resource element (BPRE), wherein the BPRE is a ratio of the bit quantity of the data to an equivalent quantity of resource elements that carry the data, the equivalent quantity of resource elements that carry the data is $N_{RE}-Q$, $N_{RE}$ is a quantity of resource elements occupied by the channel state information and the data, and Q' is a positive integer.

10. The wireless communication apparatus according to claim 9, wherein Q' is a quantity of resource elements occupied by the channel state information; or
Q' satisfies $Q'=\lceil (O_{CSI}-O_{ref}) \times \beta \rceil$, wherein $O_{CSI}$ is the bit quantity of the channel state information, $O_{ref}$ is a reference bit quantity of the channel state information, and $\beta$ is a multiplication factor.

11. The wireless communication apparatus according to claim 9, wherein the transceiver is further configured to:
before sending the channel state information and the data, receive indication information from an access network device, wherein the indication information indicates $O_{ref}$.

12. The wireless communication apparatus according to claim 11, wherein the indication information comprises a rank indicator; and
the processor is further configured to determine $O_{ref}$ based on the indication information.

13. A non-transitory computer readable storage medium, comprising computer instructions that when executed by at least one processor cause a wireless communication apparatus to perform the steps of:

generating channel state information and data; and
sending the channel state information and the data over a data channel in a same time unit, wherein transmit power of the data channel is determined based on a bit quantity of the data and a bit quantity of the channel state information;
wherein the transmit power is directly proportional to bits per resource element (BPRE), wherein the BPRE is a ratio of a first bit quantity to $N_{RE}$ the first bit quantity is a sum of the bit quantity of the data and a first equivalent bit quantity of the channel state information, $N_{RE}$ is a quantity of resource elements that carry the channel state information and the data, the first equivalent bit quantity of the channel state information is $\lceil O_{CSI} \times \beta \rceil$, $O_{CSI}$ is the bit quantity of the channel state information, and $\beta$ is a multiplication factor.

14. The non-transitory computer readable storage medium according to claim 13, wherein
the transmit power is directly proportional to bits per resource element (BPRE), wherein the BPRE is a ratio of a second bit quantity to $N_{RE}$ the second bit quantity is a sum of the bit quantity of the data and a second equivalent bit quantity of the channel state information, $N_{RE}$ is a quantity of resource elements that carry the channel state information and the data, the second equivalent bit quantity of the channel state information is $\lceil (O_{CSI}-O_{ref}) \times \beta \rceil$, $O_{CSI}$ is the bit quantity of the channel state information, $\beta$ is a multiplication factor, and $O_{ref}$ is a reference bit quantity of the channel state information.

15. The non-transitory computer readable storage medium according to claim 14, comprising:
the indication information comprises a rank indicator; and
determining $O_{ref}$ based on the indication information.

16. The non-transitory computer readable storage medium according to claim 13, wherein
the transmit power is directly proportional to bits per resource element (BPRE), wherein the BPRE is a ratio of the bit quantity of the data to an equivalent quantity of resource elements that carry the data, the equivalent quantity of resource elements that carry the data is $N_{RE}-Q'$, $N_{RE}$ is a quantity of resource elements occupied by the channel state information and the data, and Q' is a positive integer.

17. The non-transitory computer readable storage medium according to claim 16, wherein Q' is a quantity of resource elements occupied by the channel state information; or
Q' satisfies $Q'=\lceil (O_{CSI}-O_{ref}) \times \beta \rceil$, wherein $O_{CSI}$ is the bit quantity of the channel state information, $O_{ref}$ is a reference bit quantity of the channel state information, and $\beta$ is a multiplication factor.

* * * * *

UNITED STATES PATENT AND TRADEMARK OFFICE
CERTIFICATE OF CORRECTION

PATENT NO. : 11,201,655 B2  
APPLICATION NO. : 16/867819  
DATED : December 14, 2021  
INVENTOR(S) : Zhang et al.

Page 1 of 1

It is certified that error appears in the above-identified patent and that said Letters Patent is hereby corrected as shown below:

In the Claims

In Column 18, Line 26, in Claim 2, delete "$N_{RE}$" and insert -- $N_{RE}$, --.

In Column 19, Line 31, in Claim 9, delete "$N_{RE}$–Q," and insert -- $N_{RE}$–Q', --.

In Column 20, Line 9, in Claim 13, delete "$N_{RE}$" and insert -- $N_{RE}$, --.

In Column 20, Line 22, in Claim 14, delete "$N_{RE}$" and insert -- $N_{RE}$, --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*